Jan. 21, 1930.　　　H. B. COPELAND　　　1,744,107
TRAFFIC SIGNAL
Filed March 13, 1929
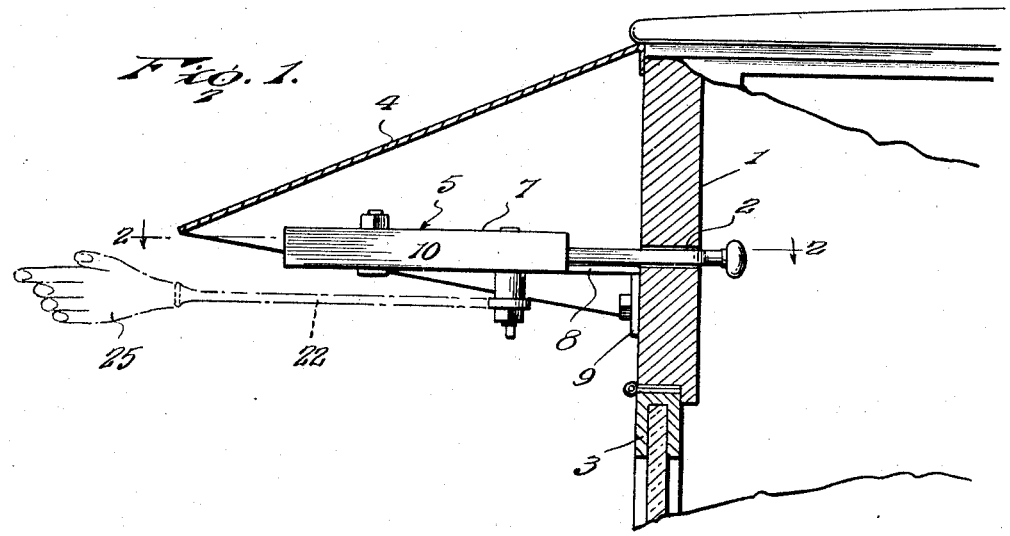
Fig. 1.
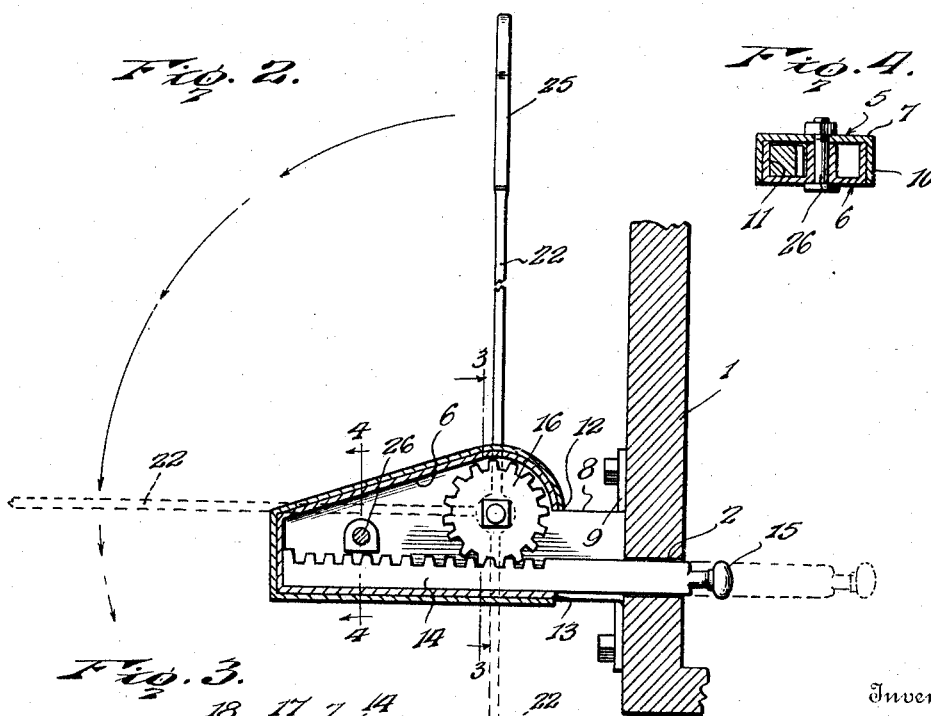
Fig. 2.
Fig. 4.
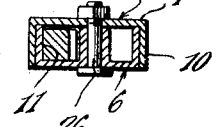
Fig. 3.
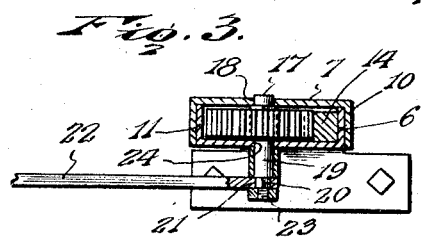
Inventor
H. B. Copeland.
By Lacey & Lacey, Attorneys Patented Jan. 21, 1930

1,744,107

UNITED STATES PATENT OFFICE

HIRAM B. COPELAND, OF BIRCHWOOD, TENNESSEE, ASSIGNOR OF ONE-THIRD TO HORACE G. LOFTIS, OF ALGOOD, TENNESSEE

TRAFFIC SIGNAL

Application filed March 13, 1929. Serial No. 346,629.

The present invention is directed to improvements in traffic signals.

The primary object of the invention is to provide a device of this character so constructed that it can be conveniently applied to a motor vehicle, the construction and arrangement being such that the driver of a car equipped with the device may easily and quickly operate the same to indicate to following traffic that he is about to make a turn, slow down, or stop his car.

Another object of this invention is to provide a device which is extremely simple in construction, efficient in operation, durable, and one which can be manufactured at a very small cost.

Another object of the invention is to provide a device of this character wherein the signal will represent a hand in order that it will be more impressive, and while the device is more particularly used in connection with automobiles of the closed type, it is not necessarily limited to such use since it can be attached to cars of the open type.

With these and other objects in view, this invention resides in the novel features of construction, formation, combination and arrangement of parts to be hereinafter more fully described, claimed, and illustrated in the accompanying drawings, in which:

Figure 1 is a side elevation of the device showing it in place upon a vehicle, the part of the vehicle to which the device is attached being shown in section.

Figure 2 is a sectional view on the line 2—2 of Figure 1.

Figure 3 is a sectional view on the line 3—3 of Figure 2.

Figure 4 is a sectional view on the line 4—4 of Figure 2.

Referring to the drawings, the numeral 1 designates a part of an automobile frame and in which is formed an opening 2, the usual windshield 3 being shown connected to the part 1. The portion 1 of the frame is provided with the usual visor 4 and under which the signaling device is positioned.

The signal comprises a casing 5 which consists of a lower section 6 and an upper section 7, the lower section having an arm 8 carried thereby which is provided with a bracket 9 adapted to be bolted or otherwise suitably secured to the part 1 of the frame. The upper section 7 is provided with a depending flange 10 and snugly fits the upstanding flange 11 of the lower section 6, said flanges, at their rear ends, being provided with openings 12 and 13. Slidable in the casing is a rack bar 14 which extends through the openings 12 and 13 of the respective sections and operates in the opening 2, there being a knob 15 upon the rear end of the rack bar in order that it can be reciprocated.

A pinion 16 is mounted in the casing and has a trunnion 17 upon its upper end which is journaled in a bearing 18 formed in the upper section 7, there being a stub shaft 19 depending from the pinion and having its lower end provided with a squared portion 20 for engaging the similarly shaped socket 21 formed in the arm 22, said arm being retained in place by the clamping nut 23. The stub shaft 19 is journaled in the bearing 24 formed in the lower section 6, as more clearly shown in Figure 3 of the drawings.

The arm 22 has carried by its outer or free end, a signaling member 25 which represents the human hand.

The sections 6 and 7 of the casing 5 are retained in interlocked relation by the clamping bolt 26. Upon reference to Figure 2 it will be noted that the teeth of the rack bar 14 mesh with the teeth of the pinion 16 so that when the rack bar is slid to and fro, rotary movement will be imparted to the pinion and through the instrumentality of the stub shaft 19 the arm 22 will be swung to its operative or its inoperative position.

As shown in full lines in Figure 2 of the drawings, the arm 22 is in its normal or inoperative position, but it will, of course, be understood than when it is desired to signal it is only necessary that the rack bar be pulled rearwardly by the driver, whereupon the arm 22 will swing in the direction of the arrows so that hand 25 carried thereby will project slightly beyond the left hand side of the car to be readily discernible by the driver of a following vehicle, and, in this manner, the driver of the vehicle following will be notified that the vehicle in front is about to make a turn, stop, or slow down.

From the foregoing, it is thought that the construction, operation, and many advantages of the herein described invention will be apparent to those skilled in the art, without further description, and it will be understood that various changes in size, shape, proportion, and minor details of construction may be resorted to without departing from the spirit or sacrificing any of the advantages of the invention.

What is claimed is:

A traffic signal for motor vehicles comprising a casing adapted to be supported by the vehicle, said casing consisting of upper and lower interfitting sections, means for detachably connecting the sections, a bearing in the upper section, a rack bar slidable in the casing and extending into the vehicle, a pinion rotatable in the casing and having a stub shaft depending from the bottom section thereof, a trunnion extending from the pinion and engaged in said bearing, an arm having one end fixed to the stub shaft, an indicating member upon the free end of the arm, said rack bar being in mesh with the pinion to impart rotary movement thereto upon sliding the rack bar.

In testimony whereof I affix my signature.

HIRAM B. COPELAND. [L. S.]